Patented Aug. 18, 1936

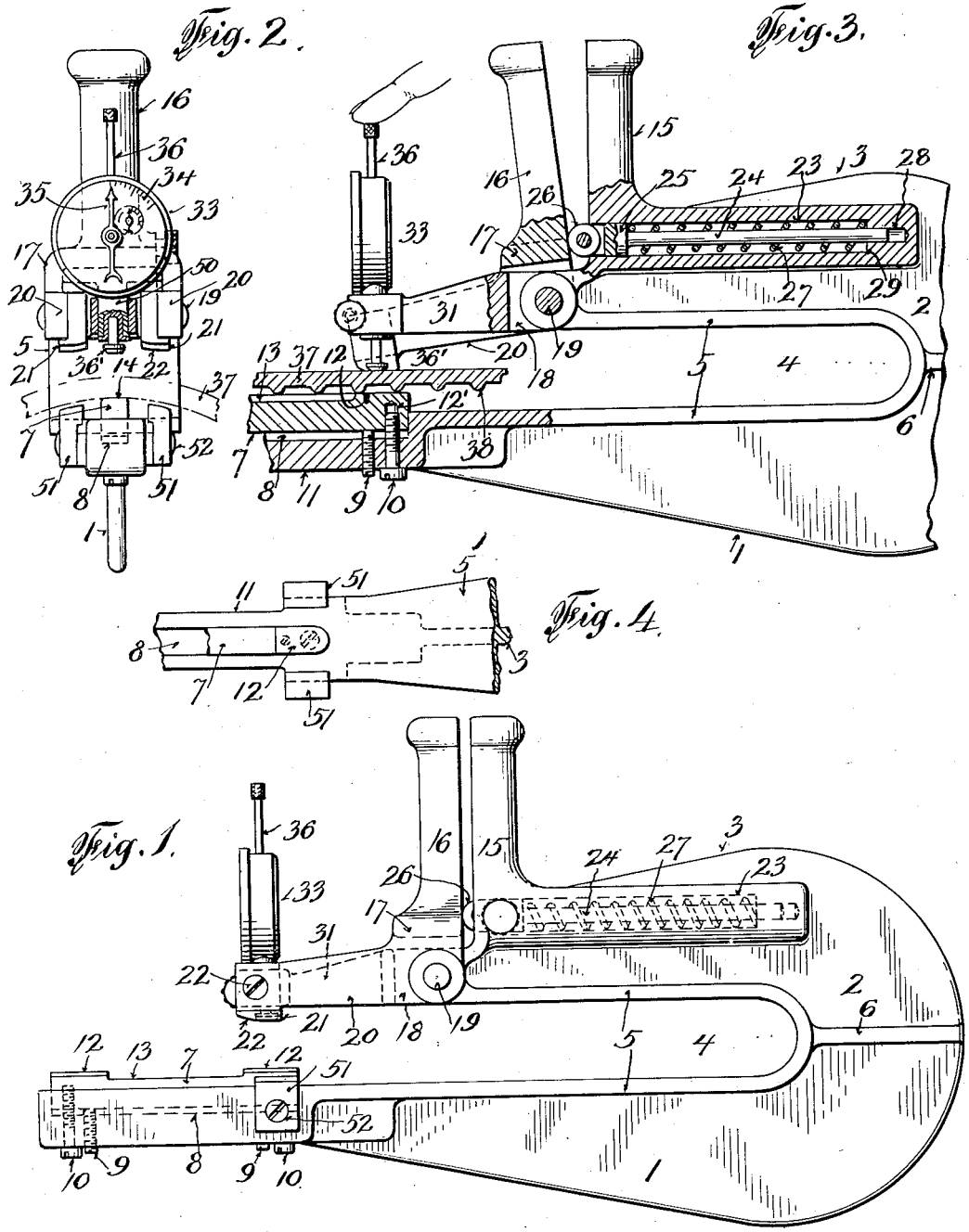

2,051,357

UNITED STATES PATENT OFFICE 2,051,357

GAUGE

Henry C. Zenke, Richmond Hill, N. Y.

Application September 14, 1932, Serial No. 633,096

13 Claims. (Cl. 33—147)

My invention relates to gauges and I have designed it more particularly for gauging stereotype plates, electrotype plates, zinc plates, curved or flat, jackets and shell casts, all used in the art of printing, and I will describe the invention as so embodied without, however, intending to limit its use to any particular field.

Heretofore, it has been difficult to measure stereotype plates, zinc plates and the like, especially when they are curved to correspond with the circumference of the printing cylinder of a printing press because such gauges as were available were not accurate in their operation. Such gauges as are available, if of the portable or micrometer type, either have not enough reach to measure portions of the plate other than the edge, or, if built for larger reach, they are inaccurate or unreliable, because the deflection of the body of the gauge cannot be kept uniform by the person measuring. The reading depends to a large extent on the "feel" of this person. If the gauges be of the type that employs convex saddles to support the plate, they are heavy, and therefore stationary; moreover they are suitable only for plates that have a curvature to fit the saddle. Besides, the contact area of a saddle is large and a possible deflection in the plate may lead to faulty measuring of the thickness thereof.

In order to obtain correct readings of the thickness of plates measured, it is important that the axis of the dial indicator be at right angles to the surface of the plate. In the present case there are provisions made to have the gauge align itself automatically so that the indicator axis is maintained exactly at right angles with the surface of the plate.

The present gauge embodies a frame or yoke which straddles the plate to be measured, from one side, it being made in the shape of a U, and the arms of this frame are of sufficient length to permit the anvil to extend anywhere from one side edge of the plate to the middle thereof so that by reversing the gauge and applying it first to one side of the plate and then to the other, all portions of the plate may be reached by the gauge for determining the thickness of any portion of it.

The present device is simple, inexpensive to manufacture, and there are no delicate parts to become inoperative. The gauge will indicate differences in thickness of plates within one-half of one one-thousandth of an inch, which is sufficient for all practical purposes in the printing art.

I have provided means for pressing against the periphery of the plate in opposition to the anvil and this pressure as represented by action of said means causes a slight deflection of the frame. This deflection, which is caused by preloading, is by adjustment of the device eliminated from the reading on the dial so that the gauging of the thickness of the plate is not rendered inaccurate.

Other features and advantages will be set forth in the following detailed description of my invention, In the drawing forming part of this application, Figure 1 is a perspective view of a gauge embodying my invention in the preferred form, Figure 2 is an end elevation thereof, showing the gauge applied to a curved printing plate or stereotype plate ready for gauging the thickness thereof, Figure 3 is an elevation of a portion of the gauge applied to a plate, portions being broken away to show the interior, and Figure 4 is a horizontal section through the center of the gauge showing portions of the lower arm.

In the drawing I have shown a frame of U shape, comprising a long bar or leg 1 forming one portion of the U and which is the member that will lie inside or under the plate which is to be gauged, and this arm carries the anvil as will be hereinafter described.

At 2 the frame is curved or looped, and from this curved portion extends the second or upper arm 3 of the frame which is shown as extending parallel to the lower arm 1 and spaced from it to provide a space 4 between the arms into which the side of a plate may extend more or less according to the position of the anvil in relation to the plate at the time the gauging operation is to take place. Preferably, the inner portions of both arms and the loop member of the frame are reinforced by means of the flange 5 extending around these members to stiffen the same and thereby prevent any excessive bending action of the frame. I have also shown a stiffening rib 6 extending from this flange towards the edge of the loop portion 2 of the frame.

The anvil which is to make contact with the inner or under side of a plate is shown as a block 7 which projects into a recess 8 formed at the outer end of the arm 1 of the frame, so that the upper portion of the anvil projects above the plane of the arm 1 as shown in the several figures.

The anvil is preferably made adjustable and for this purpose I have shown two adjustable screws 9 which are threaded into apertures in the under side of the arm 1 to form abutments for opposite ends of the anvil.

Screws 10 pass through the portion 11 of the frame arm 1 and are threaded into apertures in the under side of the anvil so that these screws serve to draw the anvil downwardly against the stop screws 9. The stop screws may be adjusted to raise or lower either or both ends of the anvil for the purpose of leveling the same and otherwise truing it and for calibrating to allow for deflection of the frame as will be set forth. The screws 10 may be slacked off slightly whenever the stop screws 9 are to be adjusted and when the position of the anvil is accurately adjusted the screws 10 may be again tightened to hold the anvil in fixed position in relation to the frame.

The anvil is disposed in line with the arm 1 of the frame and it preferably has at least two contact portions 12 raised above the intermediate portion 13. The top surfaces 14 of the contact members 12 of the anvil are preferably arched as shown in Figure 2, but on a radius which is slightly smaller than the radius of the inner surface of the smallest plates which are to be gauged, in order that the contact between the portions 12 of the anvil will be a line contact rather than a broad contact.

The upper arm 3 of the frame is shown as provided with an upstanding and fixed handle member 15 by means of which the gauge may be grasped for handling and also to co-operate with a movable handle. The latter is shown at 16 in such relation to the stationary handle 15 that both may be grasped in one hand for a purpose which will be hereinafter set forth.

The handle 16 is fixed to or integral with the yoke 17 which straddles the bracket 18 extending forwardly of the frame arm 3; and this yoke is pivotally mounted on the bracket by means of a stud or shaft 19 passing through the bracket and through the opposite arms of the yoke.

From the yoke there extend forwardly two parallel arms 20 which are fixed to or integral with the yoke so that they move therewith and with the movable handle 16. The forward or free ends of the arms 20 have mounted thereon the two pressure members 21 which are mounted on the studs 22 and which are bolted to the ends of the arms 20. Preferably, the peripheries of these pressure members are curved, as shown at 22 in Figure 2, in order that they may have a limited surface contact with the top of the printing plate and slide readily thereover.

There is a longitudinally extending bore 23 in the arm 3 of the frame, in which is housed a spring plunger 24 which is adapted to slide longitudinally in this bore. One end of the plunger travels in a small or sub bore 28 which acts as a guide for one end of the plunger, whereas the other end of the plunger has an enlarged head 25 which is guided in the bore 23. Within this latter bore and coiled about the plunger there is a spring 27 which presses at one end against the shoulder 29 and at the other end against the head 25 of the plunger, so that this spring normally presses the plunger toward the left in Figure 3 and when the plate is gripped between the anvil and the members 22 by the pressure of the spring 27 acting on the lever 16, 20 the device is self-supporting upon the plate.

On the end of the plunger which projects beyond the bore 23 there is an anti-friction roller 26 mounted to engage one side of the movable handle 16 so that the spring plunger normally presses the movable handle and causes it to swing on its pivot 19 away from the fixed handle 15.

I have shown the bracket or arm 31 integral with the fixed bracket 18 and extending forwardly over the anvil. On the outer or free end of this bracket 31 there is mounted a micrometer 33 of any approved type, and as micrometers of this character are available on the market and are well known in the art, I have shown only the exterior parts thereof.

The micrometer has the usual dials 34 with suitable hands 35 co-operating therewith to give a reading of measurements within minute subdivisions of an inch. This micrometer is of the type wherein both hands are revolved during a reading, one making a multiple of turns to each turn of the other to provide for very fine readings on one dial after an approximate or coarser reading on the dial associated with the slower moving hands.

There is a vertically moving rod 36 passing through the casing of the micrometer and associated with and operating the several hands 35, and on the lower end of this rod there is a head 36' which is adapted to be moved into contact with the top surface or type of the plate 37 to co-operate with the anvil below for the purpose of gauging the thickness of the plate. The surface of the head 36 which contacts with the plate is preferably large enough to prevent it from entering the spaces of the letters of the type portions of the plate; or, in other words, it stops against the faces of the type surfaces in order that all the measurements will be made on the face of the type.

The micrometer is mounted to revolve in relation to the arm 31 in order that it may be turned to permit the dial to be read from any angle. For this purpose there is a stud 50 projecting from the lower side of the casing of the micrometer and this has a bore through which the rod 36 passes. The stud 50 may revolve in the socket in the arm 31 and the micrometer can therefore be turned around with the stud to face in any direction for reading.

To insure correct gauging there must be firm contact between the gauge members and the plate. The spring 27 is designed to produce nearly uniform pressure of the members 21 upon the plate so that the deflection of the frame is held within small limits of variation so that the accuracy of the gauge is within that of practical requirements.

Preferably, the pressure created by the action of the spring 27 upon the members 21 and the opposing action of the anvil is sufficient to cause the gauge to clamp upon the material with a sufficient grip to cause the gauge to be held upon the article being gauged.

At the same time this pressure is sufficient to cause the gauge to be aligned so that the indicator arm moves at right angles to the surface of the material which is being gauged. The pressure of the rod of the indicator upon the surface of the member which is to be engaged is so light as to be negligible as far as causing deflection of the gauge.

Notwithstanding the rigid character of the frame, there will be a slight deflection caused by the opposing pressures of the members 21 acting on the top surface of the plate being gauged and by the opposing action of the anvil below. The deflection will depend partly on the rigidity of the frame and partly on the strength of the spring 27. The deflection in the gauges made by me is a matter of a few thousandths of an inch, but in order to render the gauging action accurate, I have provided for preloading the gauge and I then adjust the device to prevent the deflection of the frame caused by the preloading from affecting the reading of the thickness of the plate.

In order to calibrate the device to allow for the deflection referred to, and to permit the micrometer to register the actual thickness of the plates, I proceed as follows:

While the gauge is removed from any plate, the handle 16 is released so that the arms 20 swing downwardly under the action of the spring 27 and the pressure members 21 then press downwardly on the top surfaces of the members 51. The gauge is now preloaded so that the tendency of the two parallel arms of the frame to move apart under the action of the spring 27 causes a slight deflection of the frame. If the rod 36 is allowed to rest on the top surface of the anvil member 12, the pointers of the dial will be affected by the deflection of the frame. While the rod 36 is pressing on the top of the anvil, the position of the latter in its socket 8 will be adjusted to counteract the preloading as follows:

The screws 10 will be slacked off to permit the anvil to be adjusted and then the positioning screws 9 will be turned to the right or left in order to raise or lower the anvil, and this will change the position of the rod 36 since the latter is resting on the anvil. The anvil will be adjusted in its vertical position until the pointers on the micrometer register zero; and when that occurs the screws 10 will be tightened to retain the anvil in its adjusted position. While this adjustment is being made, the pressure members 21 are pressing against the co-operating pressure members 51 which are carried on the frame, or in other words, the adjustment is made while the frame is preloaded.

The two members 51 are secured by the bolts 52 to the lower arm of the frame. The top surfaces of these pressure members are shown as curved or arched in Figure 2 and lying on opposite sides of the anvil.

When the lever arms 20 are pressed downwardly by the spring 27 and there is no plate in position for gauging the upper pressure members 21 rest upon the top surfaces of the lower members 51 and preload the frame as above stated. The top surfaces of the lower member 51 lie slightly below the top surface of the portions 12 of the anvil so that when the under side of the plate rests on the anvil it will not make contact with the lower members 51. Where the material being gauged is very thin and bendable it may be deflected against the members 51.

When the frame has been preloaded in the manner described, and the anvil has been adjusted so that when the rod 36 rests on the top surface of the anvil with the dials of the micrometer at zero, allowance will have been made for the deflection of the frame caused by the action of the spring 27. Thereafter the reading of the micrometer will indicate the actual thickness of the plate, the deflection of the frame having been allowed for by the above adjustment of the anvil.

*Operation*

In Figures 2 and 3 I have shown a portion of a curved stereotype plate 37 with the gauge in position for determining the thickness of the plate. The plate shown herein being gauged is arched in order to conform with the periphery of the plate cylinder of a printing press. It will be noted that the under side of the plate, instead of being a smooth surface is provided with raised ribs 38 extending at right angles to the axis of the plate, as shown in the drawing.

The bottoms or under surfaces of these reinforcing ribs are the portions of the plate which rest directly against the periphery of the plate cylinder of the press and it is therefore necessary in gauging the thickness of the plate to determine the thickness at places which will include the reinforcing ribs. For this reason the anvil is made long enough to rest on at least two of these reinforcing ribs as shown in Figure 3. Assuming that the anvil has been properly adjusted in its socket 8 by means of the abutment screws 9 and that the anvil has been secured firmly in place by the screws 10, and that the adjustment of the anvil has been made to allow for deflection of the frame, the operation of the device will be as follows:

Normally, the movable handle 16 is swung over in the position shown in Figure 3 by the action of the spring plunger, so that the pressure members 21 extend downwardly with their peripheries on a line with or slightly below the top surfaces of the contact members 12 of the anvil. To place the gauge on a portion of the plate to be gauged, the operator grasps the handles 15, 16 and squeezes them so that the movable handle is moved toward the stationary handle. This will rock the movable handle on its pivot 19 in opposition to the spring plunger, so that the yoke 17 will move and the arms 20 will be lifted or swung upwardly to move the pressure members 21 above the plane of the contact members 12 of the anvil a sufficient distance to allow the gauge to be presented over one side of the plate 37, with the anvil moving under the plate and the pressure members 21 moving over the top thereof.

The gauge may be inserted so that the anvil makes contact at any position between one side of the plate and the median line thereof, the arms of the yoke of the frame being sufficiently long to allow the anvil to be moved from the side of the plate to or beyond the median line thereof. As soon as the anvil has passed under the plate and the pressure members 21 lie over the top of the plate, the operator may release his grip on the movable handle so that the spring plunger will act to rock the movable handle 16 away from the stationary handle. This will rock the yoke 17 upon the pivot 19 and the arms 20, moving with it, will press the members 21 down against the top or type surface of the plate. The pressure members 21 are therefore resistibly pressed against the type surface of the plate which is the outer or peripheral portion thereof, while the anvil presses against the under or bottom side of the plate.

If the gauge is held at right angles to the side edge of the plate, the contact members 12 of the anvil will make contact with the under side of the plate on a line which is parallel with the axis of the plate. When the gauge is positioned at the particular place where the thickness is to be determined the operator will press the rod 36 of the indicator downwardly as shown in Figure 3, until the head of the rod comes into contact with the type surface of the top or periphery of the plate. The rod 36 is normally pressed upwardly by a spring within the indicator, keeping the hand 35 at the starting or zero position.

The portion of the plate lying between the anvil and the surface of the head of the rod will thus be gauged and the measurement of the thickness of this portion of the plate will be determined by reading the hands and dials of the indicator.

The deflection of the frame having been allowed for by the adjustment of the anvil, the dial reading will indicate the actual thickness of the plate.

The anvil will not be affected and the reading made inaccurate by such very slight local imperfections on the under side of the plate as will not be capable of affecting the position of the plate on the cylinder. The members 21 are pressed downwardly on the top of the plate and they hold the under side of the latter against the top surface of the anvil while the reading of the thickness of the plate is being taken, so that the line contact will be along the center of the contact members 12 of the anvil and directly in line with the rod 36 so that the reading will be an accurate indication of the thickness of the plate and will be unaffected by the curvature of the latter. The members 21 provide a broad contact on the top surface of the plate so that the gauge is held steady and accurate in relation to the plate. The line of contact between the anvil and the plate is parallel with the axis of the plate, that is, parallel to the axis of a cylinder of which the plate is a segment.

The device, if constructed as shown in the drawing, provides a four-point contact with the plate; that is to say, the two contact members 12 of the anvil form two of the contacts which are at the under side of the plate, whereas the two members 21 form the additional contacts at the upper side of the plate. The points of contact of the contact members of the anvil are in line crosswise of the plate but parallel with its axis, whereas the contacts made by the members 21 are laterally of or on opposite sides of those of the anvil. Preferably, the members 21 are arranged as shown in Figure 3 to make contact with the plate adjacent the rear contact member 12 of the anvil.

After various portions of the plate have been measured with the gauge, while the latter is extended in from one side of the plate, the gauge may be turned around and inserted from the opposite side of the plate and various portions along this half of the plate may be gauged.

If the gauge is to be shifted circumferentially on the plate, the movable handle may be operated to release the pressure of the members 21 on the plate and then the gauge may be shifted circumferentially of the plate to make additional readings. In this manner the entire plate may be gauged to determine thin or thick spots at any portion of the plate.

It will be apparent that while the present gauge is suitable for measuring curved plates of whatever character, it may likewise be used for flat plates without change, as the anvil and the pressure members will engage the flat plate just as readily as a curved one. The present device may also be used in gauging the thickness of various portions of a jacket used on an impression cylinder as well as for gauging other forms of plates.

The present device is self-aligning in its action; that is to say, the co-operative action of the members 21 pressing on the top of the plate, and the anvil making contact on a line with the under side of the plate, the members 21 being spaced laterally on each side of the contact line of the anvil, causes the anvil to lie parallel with the axis of the plate without any special attempt on the part of the operator to bring about this alignment. The alignment of the anvil with the axis of the plate is necessary to avoid erroneous reading because if the anvil should lie at an angle to the axis of the plate it is obvious that the gauging of the thickness of the plate will be erroneous.

The indicator may be grasped by the hand and turned around its own axis within the bearing in the arm 31 in order to place the dial of the indicator at any angle from which the operator desires to read the position of the hands of the indicator. The term "anvil" is used herein in the broad sense to refer to any surface which may make contact with one side of the material to be gauged.

Having described my invention, what I claim is:

1. In a device for gauging the thickness of curved plates, a frame having members for extending over and under the plate respectively, one of said members having a pocket to receive an anvil, an anvil disposed in said pocket, means for adjusting said anvil in said pocket, said anvil being formed to have an extended, narrow line contact with the concave surface of the plate, and a movable member carried by the other member of said frame and having means engaging the convex surface of the plate opposite to said anvil, and an indicator cooperating with said anvil to gauge the thickness of the plate.

2. In a device for gauging the thickness of curved plates, a frame having members for extending over and under the plate respectively, an anvil carried by one of said members for engaging the concave surface of the plate, said anvil having a plurality of contact surfaces, each formed to have an extended, narrow line contact with the concave surface of the plate, a movable member carried by the other member of said frame, a plurality of contact members carried by said movable member and engaging the convex surface of the plate opposite said anvil and on opposite sides of the plane of the line of contact of said anvil, and an indicator cooperating with said anvil to gauge the thickness of the plate.

3. In a device for gauging the thickness of curved plates, a U shaped frame having one arm longer than the other, an anvil mounted on the longer arm of the frame and formed to have an extended, narrow line contact with the concave surface of the plate, a yoke pivoted to the shorter arm of said frame and having arms projecting forwardly over said anvil, contact members carried by said latter arms and arranged to contact with the convex surface of the plate opposite said anvil and on opposite sides of the vertical plane of the line of engagement of said anvil with said plate, spring means for causing said contact members to move toward the plate, a fixed handle on said shorter arm of the frame member, a movable handle associated with said yoke, said handles being adapted to be gripped by one hand for the purpose of swinging said yoke to move the contact members away from the plate, a bracket on said shorter arm of the frame member extending between the arms of said yoke and a member mounted on said bracket and arranged to cooperate with said anvil to gauge the thickness of the plate.

4. In a device for gauging the thickness of plates, a frame having members for engaging over and under the plate respectively when applied to an edge of a plate, an anvil carried by one of said members for engaging one surface of the plate, said anvil having an extended narrow line contact with the surface of the plate, a movable member carried by the other member of said frame and having contact members for engaging the surface of the plate opposite to that engaged by said anvil, contact members arranged below the contact plane of said anvil with which said first contact members engage when there is no plate between said anvil and said first contact members, and an indicator co-operating with said anvil to gauge the thickness of the plate.

5. In a device for gauging the thickness of curved plates, a frame having members for extending over and under the plate respectively when applied to an edge of a plate, an anvil carried by one of said members for engaging the concave surface of the plate, means for adjusting the height of said anvil, a movable member carried by the other member of said frame and having contact members for engaging the convex surface of said plate opposite said anvil, and contact members on the frame member which carries said anvil and disposed below the plane of contact of the anvil with the plate, said first contact members being adapted to engage said second contact members for preloading the frame, and an indicator co-operating with said anvil to gauge the thickness of the plate.

6. In a portable hand device for gauging the thickness of curved plates, a frame having members arranged to extend over and under a plate respectively, when applied to an edge of the plate, an anvil carried by one of said members for engaging the concave surface of the plate, a movable member carried by the other member of said frame, means for moving said movable member to cause the same to press on the convex side of the plate opposite to that engaged by said anvil and to render said device self-supporting on the plate, and an indicator arranged to engage the surface of the plate opposite to that engaged by said anvil when the plate is clamped between said movable member and said anvil.

7. In a portable hand device for gauging the thickness of curved plates, a frame having members arranged to extend over and under a plate respectively, when applied to an edge of the plate, an anvil carried by one of said members for engaging the concave surface of the plate, a pivotal member carried by the other member of said frame and having means adapted to contact with the convex surface of the plate opposite said anvil, means for rocking said pivotal member to cause the contact means to press on the surface of the plate and to render said device self-supporting on the plate, and an indicator arranged to engage one surface of the plate when the plate is clamped between said contact means and said anvil.

8. In a portable hand device for gauging the thickness of curved plates, a frame having members arranged to extend over and under the plate respectively when applied to an edge of the plate, an anvil carried by one of said members for engaging the concave surface of the plate, a pivotal member carried by the other member of said frame, spring means for rocking said pivotal member to cause the same to press on the convex side of said plate opposite said anvil, with sufficient force to maintain said device self-supporting on said plate, a handle member for rocking said pivotal member, and an indicator arranged to co-operate with said anvil to determine the thickness of the plate.

9. In a portable hand device for gauging the thickness of curved plates, a frame having members arranged to extend over and under the plate respectively when applied to an edge of the plate, an anvil carried by one of said members for engaging the concave surface of the plate, a pivotal member carried by the other member of said frame and having means for pressing on the convex surface of the plate, and a spring for actuating said pivotal member and adapted to make said device self-supporting on said plate, co-operating handle members arranged respectively on one member of said frame and another handle member on said pivotal member, said handles being adapted to be operated by one hand to swing said pivotal member, and an indicator arranged to co-operate with said anvil to determine the thickness of the plate.

10. In a portable hand device for gauging the thickness of curved plates, a frame having members arranged to extend over and under the plate respectively when applied to an edge of the plate, an anvil carried by one of said members for engaging the concave surface of the plate, a pivotal member carried by the other member of said frame and having means to press on the convex surface of the plate to render said device self-supporting on said plate, a spring plunger arranged in said second mentioned frame member and acting on said pivotal member to press it into engagement with the convex surface of said plate, and an indicator mounted on said frame and arranged to co-operate with said anvil in gauging the thickness of the plate.

11. In a portable hand device for gauging the thickness of curved plates, a frame having members for extending over and under the plate respectively when applied to an edge of the plate, an anvil carried by one of said members for engaging the concave surface of the plate, said anvil having an extended narrow line contact with the surface of the plate, a movable member carried by the other member of said frame and engaging the convex surface of the plate opposite said anvil, means for pressing said movable member against the plate to render the device self-supporting on said plate, and an indicator co-operating with said anvil to gauge the thickness of the plate.

12. In a portable hand device for gauging the thickness of curved plates, a frame having members for extending over and under the plate respectively when applied to an edge of the plate, an anvil carried by one of said members for engaging the concave surface of the plate, said anvil having an extended narrow line contact with the surface of the plate on a line parallel with the axis of the plate, a movable member carried by the other member of said frame, a plurality of contact members carried by said movable member and engaging the convex surface of the plate opposite said anvil and engaging said plate on opposite sides of the vertical plane of the line of contact of said anvil with the plate, means for pressing said movable member toward said anvil with sufficient pressure to render said device self-supporting on the plate, and an indicator co-operating with said anvil to gauge the thickness of the plate.

13. In a portable hand device for gauging the thickness of curved plates, a frame having members extending over and under the plate respectively when presented to an edge of the plate, an anvil carried by one of said members for engaging the concave surface of the plate, said anvil having an extended narrow line contact with the surface of the plate, a movable member carried by the other member of said frame, contact members mounted on said movable member and having rounded surfaces arranged to engage the convex surface of said plate opposite said anvil, means for pressing said movable member towards said anvil to render the device self-supporting on said plate, and an indicator co-operating with said anvil to gauge the thickness of the plate.

HENRY C. ZENKE.